| (12) | United States Patent<br>Wunderlich | (10) Patent No.: US 8,631,116 B2<br>(45) Date of Patent: Jan. 14, 2014 |

(54) SYSTEM AND METHOD FOR ACTIVE BUSINESS CONFIGURED WEBSITE MONITORING

(75) Inventor: John A. Wunderlich, Roswell, GA (US)

(73) Assignee: CCIP Corp., Henderson, NV (US)

( * ) Notice: Subject to any disclaimer, the term of this patent is extended or adjusted under 35 U.S.C. 154(b) by 195 days.

(21) Appl. No.: 11/946,715

(22) Filed: Nov. 28, 2007

(65) Prior Publication Data

US 2009/0138589 A1 May 28, 2009

(51) Int. Cl.
*G06F 15/173* (2006.01)

(52) U.S. Cl.
USPC .......................................... 709/224; 709/223

(58) Field of Classification Search
USPC ....................................................... 709/224
See application file for complete search history.

(56) References Cited

U.S. PATENT DOCUMENTS

| 2002/0081040 | A1* | 6/2002 | Uchida ........................ 382/311 |
| 2004/0205572 | A1* | 10/2004 | Fields et al. .................. 715/513 |
| 2006/0277087 | A1 | 12/2006 | Error |
| 2007/0179842 | A1* | 8/2007 | Chen .............................. 705/14 |
| 2008/0037853 | A1* | 2/2008 | Bernard et al. ............... 382/132 |
| 2008/0120538 | A1* | 5/2008 | Kurz et al. .................... 715/255 |
| 2009/0012852 | A1* | 1/2009 | O'Kelley et al. ............... 705/14 |

OTHER PUBLICATIONS

"WebTrends Reporting Service—Customer Integration Guide"; Internet, May 2003, pp. 1-28, XP002519228 URL:http://web.archive.org/web/20030806053504/http://download.netiq.com/CMS/WHITEPAPER/NetIQ_WP_WRSCustomer_Integration.pdf>.

\* cited by examiner

*Primary Examiner* — Shripal Khajuria
(74) *Attorney, Agent, or Firm* — Philip H. Burrus, IV

(57) ABSTRACT

The website performance monitoring systems and methods of the present invention are implemented via a website monitoring tool that includes a website canvas and a plurality of web page objects configured to be dragged and dropped onto the generic website canvas to facilitate creation of a website model. The monitoring tool also includes a graphic interface which may be utilized to define and associate performance operational rules of a website being modified or created. The performance operational rules include website performance thresholds and rules associated with alerts which may be delivered in response to a website achieving or falling below defined performance alert levels. The monitoring tool also includes a pixel module which may be engaged to assign a plurality of attributes to a pixel associated with a page within the website model. The graphic interface of the monitoring tool also includes a plurality of web page objects that are configured to be selected, dragged and dropped onto the generic website canvas to facilitate creation of a website model that illustrates the process flow of pages within the website model.

20 Claims, 6 Drawing Sheets

SYSTEM AND METHOD FOR ACTIVE BUSINESS CONFIGURED WEBSITE MONITORING

BACKGROUND

A web site monitoring system and method is a system utilizing an application to perform a process of monitoring the performance of a website. In today's information based society, success in business depends on providing potential customers with non-intrusive access to information via a website. As part of the process, businesses looking for new clients must provide a website that consistently performs well and is aesthetically appealing enough to make customers return. In some industries, where customers are required to provide information as part of an information or introductory transaction, the information provided and the steps performed prior to requesting specific customer information is critical to the successful performance of the website at selling products or identifying potential customers.

Because websites and the associated applications are a tremendous tool for driving business, optimizing the performance of the websites and applications is critical. Existing web site monitoring tools seek to optimize performance and availability of websites by ensuring that the infrastructure and underlying components are running and functioning at optimal operational capacity. Some monitoring tools perform this task by monitoring the pipes and backend parts associated with a website. Other applications perform website monitoring from an end user's perspective, monitoring all the visual elements or measuring against expected results from a given website or application. One common element in the current monitoring schemes is the use of pixels in order to capture data related to a single attribute, e.g. number of visitors to a website. However, there is not a website monitoring system that monitors from a business driven operational perspective that provides information concerning performance of the website based on a previously defined set of operational criteria. The ability to detect and capture this performance has been limited because traditional pixels have only been able to capture a single attribute. This requires the website owner to place multiple pixels on a webpage, occupying vital space on a webpage. Further, there has been no way to link or aggregate these pixels and the information captured. There is a need for a system whereby the business providing the website may efficiently capture, aggregate, and review the success and or failure of the website or application output from numerous perspectives, determining what aspects of the website are working and those that are not working and automatically receiving feedback concerning website performance in view of the operational criteria previously defined.

SUMMARY OF THE INVENTION

Consistent with embodiments of the present invention, a system and method for active business configured website monitoring is disclosed. The system is implemented through use of an application that is comprised of a plurality of modules, including a performance module, monitoring module and report module. The performance module allows a user to utilize a graphical interface to define and associate performance operational rules for a web site or web application. A graphical user interface will allow non-technical users to create and manage operational business rules, set performance thresholds, and create business defined associations between products and services within and across multiple sites or applications. Functionality within the system will be role based so users can only access, control, or even view those sites, features, or functions for which they have permissions. The defining of performance operational rules includes the setting of performance operational thresholds and alerts, creating product and services associations or groupings, and defining the site flow or transactional flow associated with each site or application. The monitoring module is configured to assess the effectiveness of the website at achieving performance criteria defined by the performance operational rules. The monitoring module transmits alerts in response to the website failing to achieve the performance criteria defined by the website performance operational rules. The monitoring module also includes an administrative component which allows users to create, modify and delete website or application models for which they have permissions. The application's report module generates reports on website operational performance and is configured to allow users to create, view, refresh and print reports in multiple custom views. The application also includes a business module that allows a user to interactively build a model representative of a website on a whiteboard. The business module includes drag and drop visual objects that may be selected and utilized to build the website on the whiteboard. The business module also allows a user to generate, modify and add page identifiers known as 'pixels' to pages within a website model, wherein a single pixel may be assigned to each page and multiple attributes may be assigned to each pixel. The business module may also allow a user to create, modify and link pixels on pages with the same and different websites.

The systems and methods for active business configured website monitoring of the present invention are implemented via a website monitoring tool that includes a website canvas and a plurality of web page objects configured to be dragged and dropped onto the generic website canvas to facilitate creation of a website model. The monitoring tool also includes a graphic interface which may be utilized to define and associate performance operational rules of a website being modified or created. The performance operational rules include website performance thresholds and rules associated with alerts which may be delivered in response to a website achieving or falling below defined performance alert levels. The monitoring tool also includes a pixel module which may be engaged to assign a plurality of attributes to a pixel associated with a page within the website model. The graphic interface of the monitoring tool also includes a plurality of web page objects that are configured to be selected, dragged and dropped onto the generic website canvas to facilitate creation of a website model that illustrates the process flow of pages within the website model.

It is to be understood that both the foregoing general description and the following detailed description are examples and explanatory only and should not be considered to restrict the invention's scope, as described and claimed. Further, features and/or variations may be provided in addition to those set forth herein. For example, embodiments of the invention may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
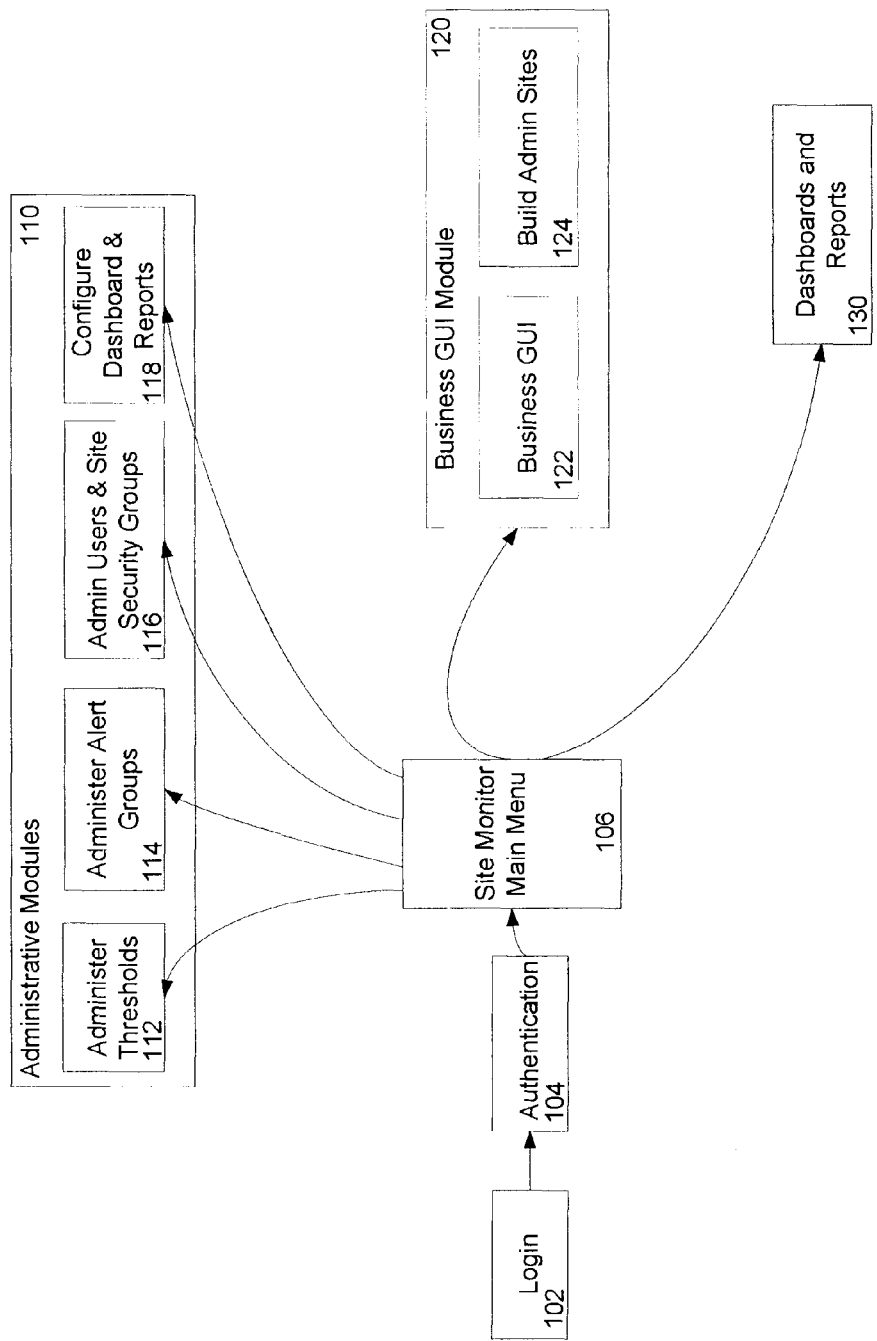
FIG. 1 is a block diagram of an operating environment illustrating functional overview.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

A system and method for active business configured website monitoring may be provided. Consistent with embodiments of the present invention, a business configured website performance monitoring system and method is disclosed. The method includes configuring a website so that it continuously assesses the effectiveness of achieving previously defined performance objectives that are defined in the process of setting website operational rules and performance thresholds. Configuring the website involves interactively building a model of the website complete with performance operational rules, whereby the website model may be utilized to generate the actual website configuration. The website model facilitates the generation of a website configured to continuously monitor the activity and performance of each page within the website in accordance with the performance operational rules. The performance operational rules include website performance thresholds and rules associated with alerts which may be delivered by email, text message, voicemail, or other communication methods in response to a website achieving or falling below defined performance levels.

Interactively building a website model involves utilizing a system application that provides a website canvas/whiteboard and a graphical user interface configured to facilitate access to drag and drop visual objects which may be selected and utilized to build the website model on the website canvas/whiteboard. In building the website model, the application allows a user to generate, modify and add pixels to pages within website model based on the visual flow of the model, wherein a single pixel may be assigned to each page and multiple attributes may be assigned to each pixel. The application may also allow a user to create, modify and link pixels on pages within the same and or different websites.

The application which enables the system and method for active business configured website monitoring of the present invention provides a business intelligence layer to website monitoring whereby operational rules and thresholds may be defined in order to create a mechanism that facilitates automatic alerts surrounding the operational rules and thresholds. The application is comprised of a plurality of modules, including a performance module, monitoring module and report module. The performance module allows a user to utilize a graphical interface to define and associate performance operational rules within a web site. The graphical interface that a user may view and access is dependent upon a permission level assigned to a user. The defining of performance operational rules includes the setting of performance operational thresholds and alerts. The monitoring module is configured to assess the effectiveness of the website at achieving performance criteria defined by the performance operational rules. The monitoring module facilitates the capture and display of information representative of the operational performance of the website. The monitoring module also transmits alerts in response to the website failing to or achieving performance criteria defined by the website performance operational rules. The monitoring module includes an administrative component that allows users to create, modify and delete websites based on permission levels assigned to the users. The application's report module generates reports on website operational performance and is configured to allow users to create, view, refresh and print reports in multiple custom views.

FIG. 1 is a block diagram of an operating environment illustrating a functional overview of the application that implements a system and method for active business configured website monitoring. The web based application includes a Login Page 102 and may be role based. The application requires a user to enter a username and password for authentication 104 to reach the application main menu 106. In one embodiment, the application main menu 106 is role based and users may only view links and menus for which they have permission. In an alternative embodiment, at application main menu 106, users may view all links and menus but may only access the functionality of the links and menus for which the user has permission. For example, in an embodiment, when a user logs into the application 102 and reaches the application main menu 106, the user may see a user specific menu that allows the user to access the administrative modules 110, business GUI module 120 and specific reports 130 to which they have permission to access. For example, if the user is in a company's Marketing Group, they only see links and menus that illustrate marketing information. The type and level of marketing information illustrated to the user may depend on the specific user permission level. By way of further example, if the user is in a company's Finance Group, the user may only see links and menus that illustrate finance information. If the user is in a company's Collections Group, the user only sees links and menus that illustrate information relevant to collections.

A user may only click and access links to which they are authorized to access. For example, as illustrated in FIG. 1, a user views links and menus at the application main menu 106. If the user is viewing links relating to reports to which the user has access, those links at main menu 106 send the user to customized dashboards 130 when they are engaged. The customized dashboards and reports, which are accessible in the dashboard and reports module 130, may be metric specific. For example, the user may seek to determine activity related to a website offering to consumers on a specific type of credit card or how a business is performing in the area of collections related to a specific credit card. The user may log into the application and access dashboards and reports which illustrate information on any metric defined in the system for a credit card.

The system that enables the method of active business configured website monitoring of the present invention allows for three different process flow scenarios. A first whereby a user accesses the dashboard and reports module 130, illustrated in detail in FIG. 2. A second whereby the user accesses the business GUI module 120, illustrated in detail in FIG. 3. A third whereby a user accesses the administrative module 110, illustrated in detail in FIG. 4. As illustrated in FIG. 1, with appropriate permission, a user may view and/or access the administrative module 110 and the sub modules therein, the business GUI module 120 and the sub modules therein, and the dashboards and reports module 130.

When a system user accesses the application main menu 106, there is a very high level depiction of all modules and sub modules and functions that a user may access. All the different variations of the dashboards and reports within the dashboards and reports module 130 may be represented in the application main menu 106. These variations may be illustrated in a dropdown menu format that illustrates all dashboards of which a user may select and gain access. Alternatively, each dashboard may be fully listed out, or represented by images. Each image may also include a representative stoplight gauge, or other indicator, to represent the operational performance of various aspects of the website. In one embodiment, a user may see a rollup depiction of all dashboards and reports represented in the dashboards and reports module 130, with each having an associated stoplight gauge that depicts a red, yellow, or green light.

By way of example, if a business user has access to reports for five different credit cards, three reports of which have an associated green light, one report having an associated yellow light and one report having an associated red light, the red light may prompt the user to go and review the specifics of the credit associated with that report. The red light prompts the user to inquire as to problem with the credit card associated with the red light. When the user selects the report associated with the red light, the report may illustrate where the website performance threshold is where it should be if the performance objectives projected had been achieved. For example, the business projects that the website for the credit card associated with the red light should already have 500 bookings by a specific time. At the designated time, the system determines that there have been only 100 bookings and transmits an indication in accordance with the operational rules and alerts. The receipt of an indication of a failure to meet performance objectives advises the user and others to whom a transmission has been sent that there is a performance problem. The user may have already received emails if they are a part of an alert email group to which messages are transmitted when the website for the special credit card offering fails to achieve operational performance levels.

By way of further example, the application main menu 106 may illustrate that there are website dashboards and reports for the five different credit cards. In this example, two of the credit cards are Visa, two are MasterCard and one is Discover. If the stoplight gauge or other indicator representative of the status of each website is green, the user at the application main menu 106 may decide not to drill down into the dashboard and reports menu 130 because an indicator of green advises that everything on the websites are within the operational performance parameters. Alternatively, when the indicators associated with the five different credit cards are not all green, one indicator is red or a user receives a notice about one of the websites associated with one of the Visa cards, the user is advised that the operational performance of the website falls below acceptable threshold levels. When the user views the dashboard associated with the Visa card to which the red light is associated, indicating that there is a problem with website performance, by clicking on the associated icon the user will be taken to the dashboard and reports menu 130 at which the user will be provided a specific and detailed view of what's occurring operationally at the website associated with that Visa card. The illustration may show the user the threshold, the total number of credit cards booked, the times of the bookings, the number of errors, detailed error tests, or any other details that may be relevant to understanding the operation of a web site associated with credit card bookings.

Another example may involve websites and three separate associated Visa cards. At the application main menu 106, there may be a VISA report for each individual VISA card. There may also be a macro grouping illustrating not only that there is a first Visa card, second Visa card, and third Visa card, there's also a dashboard and report for the aggregate of all three Visa cards. The aggregate dashboard and report indicator for all three Visa cards may be yellow, when two of the Visa cards each have a green indicator green and one of the Visa card indicators is red. A yellow aggregate indicator advises that the average or aggregate is not functioning at optimal levels but is not failing. However, the individual status indicators for each individual card illustrates that two Visa cards are functioning properly and one Visa card is not. The user may then drill down on that dashboard and report and determine exactly what the problem is. For example, the thresholds may have been defined to require each website to have facilitated 500 bookings for each Visa card by a specified time. So there should be a total of 1500 bookings when looking at the three cards as an aggregate. At the specified time, if the aggregate indicator is yellow, there would be at least 1100 bookings. When the user accesses the individual reports, they may see that there have been 500 bookings at the website for a first Visa card and 500 bookings at the website for a second Visa card, but there have only been 100 bookings at the website for the third Visa card that is problematic. In order to see the problem associated with the third Visa card, the user had to access each card independently to drill down into the individual metric. Viewing the aggregate of the three Visa cards illustrates to the user that there have been a total of 1100 bookings.

The application also allows the user to choose, at the application main menu 106, the level of detail the user would like to view. In some instances, viewing the aggregate of the three Visa cards would be sufficient. In other instances, the user may desire to go in a view each individual Visa card to which a dashboard or report is attached. The application main menu 106 provides the user with flexibility of choosing a respective view before the user accesses and the dashboard and reports module 130. The function facilitated by the dashboard and reports module 130 allows a user to generate custom aggregated dashboards, reports and alerts that illustrate things such as, the health and status of different web sites, the overall metrics for what's flowing through a particular website, the earnings per click that are being generated by a website, or whatever a given measure for operational success a user desires to illustrate. The metrics that a user defines may be shown in real time concerning website operational flow.

The dashboard and reports module 130 also allows a user to create, manage, and delete thresholds and alert groups. The dashboard and reports module 130 functionality may be dynamically configured by the application users to display site level pixel metrics and measures which are rolled up across multiple sites to show aggregate pixel metrics and measures. It also facilitates assignment of business threshold(s) at the site and/or pixel level. Alerts will be triggered by a scheduled process that may send severity level defined alerts to user defined distribution lists that are also setup in the system. The dashboard and reports module 130 utilizes user defined and managed thresholds to alert systems based on the defined distribution lists. For example, a website may be working technically but some error in a dependency outside of the technical system may be failing, as defined by business rules, and this alert would pick up that failure or drop in system expected performance levels throughout based on the threshold or the business rules defined.

The administrative module 110 is a role restricted module and allows users to create, modify, and delete websites and their underlying security. Authorized users can also administer thresholds, alerts, alert groups, and administer user security for the application through use of the sub modules within the administrative module 110. The sub modules within the Administrative Module 110 includes an Administer Thresholds sub module 112, an Administer Alert Groups sub module 114, an Administer User and Site Security Groups sub module 116, and a Configure Dashboard and Reports sub module 118. The configure dashboard reports administrative sub module 118 allows users to configure dashboards and pixel reports. The user is allowed to define the dashboard content, layout, and security (which user sees which report). The business GUI sub module 122 allows a user to administer an existing site or to set up a new website by pixeling the web site. Pixeling the website is a process whereby the user adds individual components on each of the website pages, then defines and relates those attributes to each other so that they can be used to populate a report.

Business GUI sub module 122 also allows business users to utilize a whiteboard/Canvas and drag and drop visual objects to build and/or modify website models. As part of the process of building and or modifying websites, the business GUI sub module 122 includes several functions. A first function, Generate Pixels, allows the user to generate pixel code to be placed on the actual website pages. A second function, Add/Modify/Delete Pixel Attributes, allows the user to create, redefine, modify, or delete granular attributes associated with each pixel. A third function, Associate Pixels, allows pixels from multiple sites to be linked or associated into aggregate (enterprise) groups for reporting.

Figure 5:
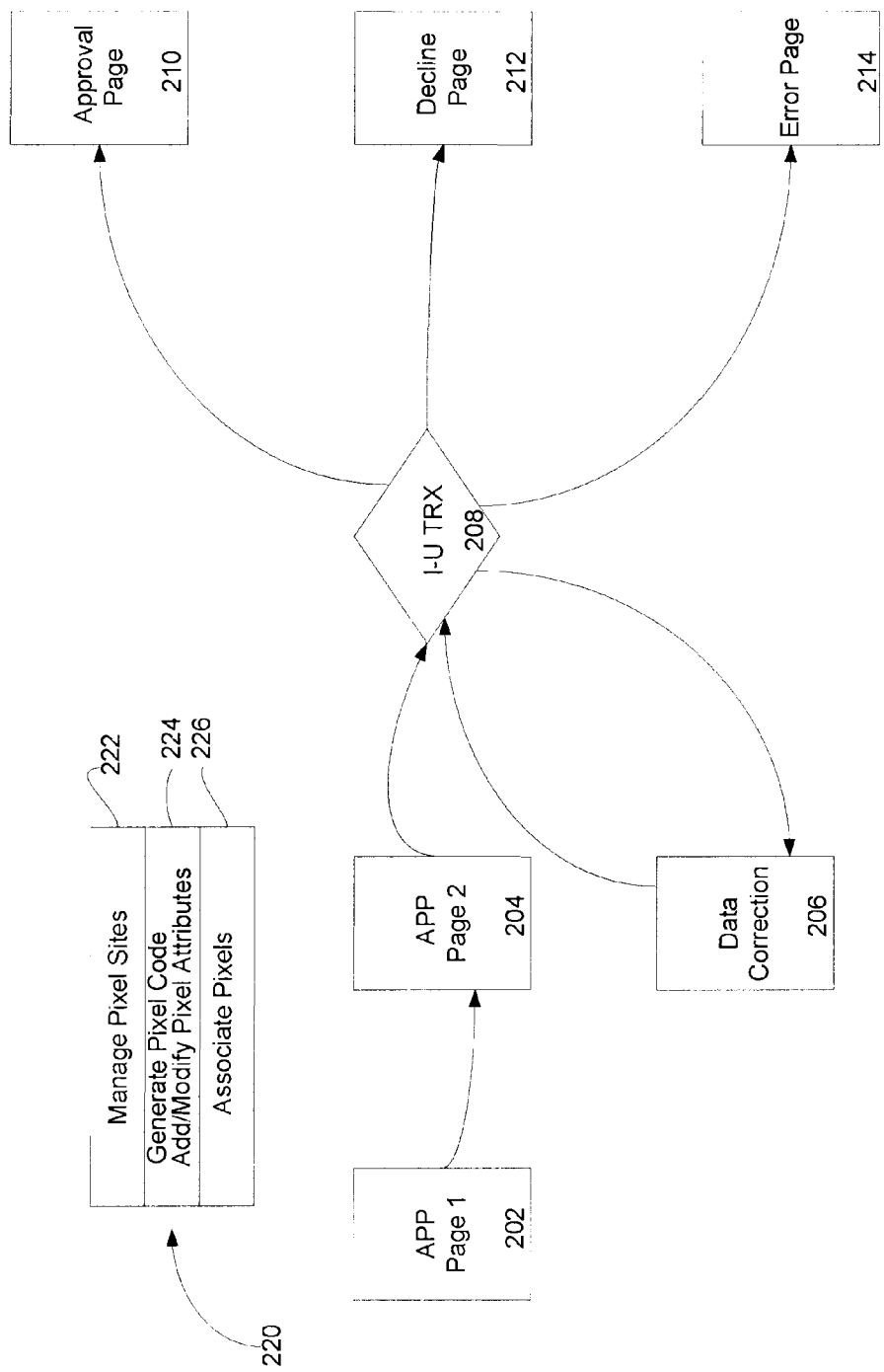
FIG. 5 is an application page process flow chart for building a website.

In practice, if a business user desires to create a new website, as part of that process, the user may need to generate pixels and attributes, and associate new site pixels with metrics. In order to create the new website, the user logs into the application 102 with their username and password. Following the authentication 104 of the username and password, the user is presented with a menu 106 of their existing sites they have permissions to view/edit. The user selects an option outside of the menu for 'Create a new site.' A blank Canvas window opens with a floating toolbar which a user can engage or click to select and drag and drop page objects onto the canvas. As illustrated in FIG. 5, by right clicking on at least one drag and drop page object, the application launches a Pixel management sub module 220, causing a pixel management window to open. The pixel management sub module provides the user with the option to manage pixel sites 222, generate pixels codes and add/modify pixel attributes 224, and associate pixels 226. Upon a user's selection of the generate pixel option, a new menu appears that displays the pixel attributes and a section where the pixel code snippet may be copied and pasted into the actual model web page for the production site. The user saves and closes the menu. If the user right clicks the same page object, this action accesses the pixel menu again allowing the user to select add/modify pixel attributes. For example, the user may define attributes such as number of visitors to the webpage, completed applications on a webpage, brand or brands associated with the webpage, responsible business units of the webpage, and a host of additional attributes that the user might define. The attribute menu then appears and the user may enter/define pixel attributes for the specific pixel for that page object. The attributes appear as their own rows (one text box per pixel attribute). Application users may add, modify the description, or delete rows in this menu by clicking a plus sign, 'X' sign or clicking in the text box to modify. Next the user saves and closes this menu. Upon the user right clicking the same page object, the user gains access to the pixel menu again and may select 'Associate Pixels.' The pixel association menu appears and the application displays a list box with all defined pixel aggregate groups. The application user can create a new group or select one or multiple pixel groups to 'associate' the current page object pixel to the selected groups in this menu. The user can also remove pixel groups from the list by highlighting the group and selecting the remove action/button.

Figure 6:
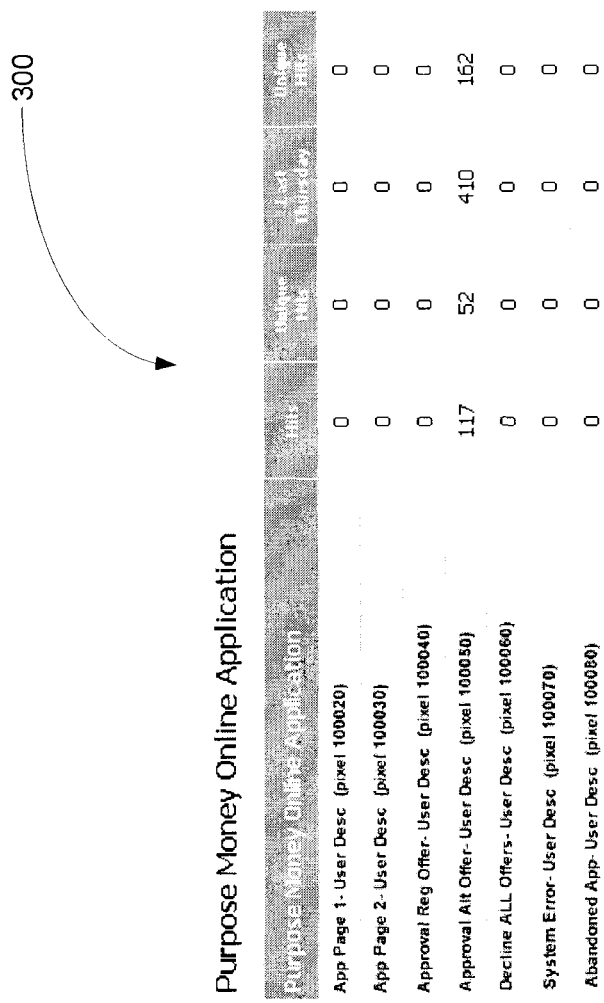
FIG. 6 is an illustration of an embodiment of a dashboard of the website monitoring system and method.

FIG. 5 illustrates an example of creating a web site model that is a two page application, consisting of application page one 202 and application page two 204. In this example, the applicant enters the website and inputs information reflecting address, social security number, name and age. This information is input on the first page of the website 202. On the second page 204, the applicant provides their core details, such as checking account information or they may need to enter specific information, such as the applicant must reside in a specific state, region, or some other limiting criteria. After the information is input, it is transmitted to the website engine and a determination is made as to whether the applicant qualifies for the credit card 208. The engine shall reply with an approval or disapproval message via an approval 210 or decline page 212. When there are other problems that occur and the question may not be sufficiently answered, an error page 214 is presented. In this example, if the website has been created and is functioning, and the user accesses the dashboard and reports module (illustrated in FIG. 1), a report 300 illustrating activity for a website having two pages 202 and 204 is illustrated in FIG. 6.

If the application user is creating new thresholds or defining an alert distribution list, they must first log onto the application console and select the administer thresholds sub module. The user selects from a list of sites. After selecting a site, the user can choose which page object or objects for which a threshold can be set within the screen. Once the threshold is set, the user can add an alert distribution group. If no groups are defined, the user can select create new alert group which will spin up a plurality of text fields where they can add one or more email addresses, define what the body (content) of the alert message will be, define the criticality/severity of the alert and then save the alert group. There is also functionality to administering the alert groups, where a user may modify or delete groups.

The Administrative Module 110 includes four sub modules, an Administer Thresholds sub module 112, an Administer Alert Groups sub module 114, an Administer User and Site Security Groups sub module 116, and a Configure Dashboard and Reports sub module 118. With the Administer Thresholds sub module 112, the user may define the type of thresholds that need to be applied to an application or website. The user may define the metric that they desire to be monitored; by client or some other metric. For example, everyday an appropriately functioning site should receive 300 people visiting in response to a television ad. The threshold level may be set at some level lower than projected people that should visit the website. If that number is not achieved following a run of the ad on television, it is assumed there is a problem with the website. Regarding the Administer Alert Groups sub module 114, when the user sets a threshold, they must also set who a respective alert needs to be sent when a threshold is not met. In this sub module the user defines what happens if the threshold is not met. In one embodiment, the user defines an email distribution list. The Configure Dashboard and Reports sub module 118 allows the user to configure dashboards and reports. This is the module where a user may set up all the particulars around what the user shall see in the dashboard and reports module 130. The user may set whether the dashboard and reports include stop lights, bar graphs, pie charts, and an indication of whether the information is critical or not critical.

Figure 2:
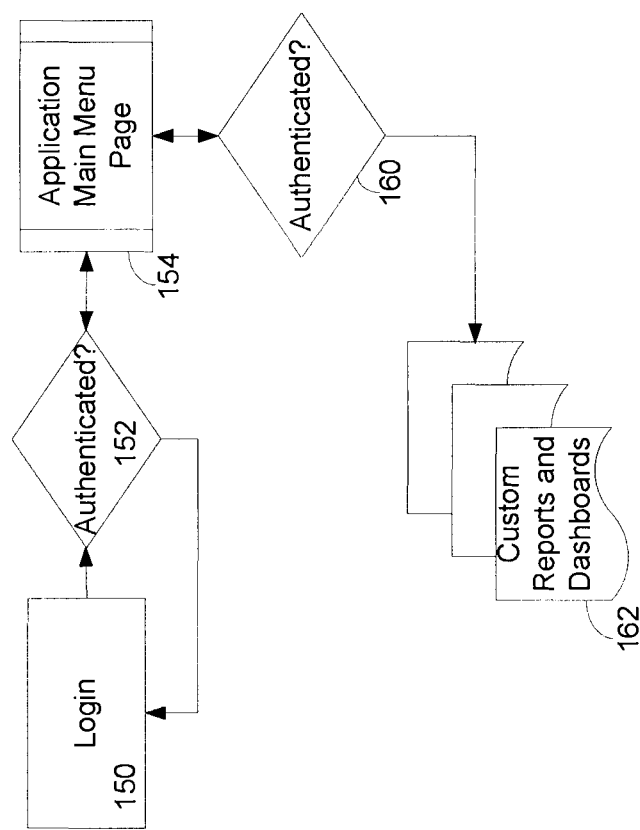
FIG. 2 is a process flow diagram of the application facilitating access to the custom reports and dashboards module of the website monitoring system and method of the present invention.
Figure 3:
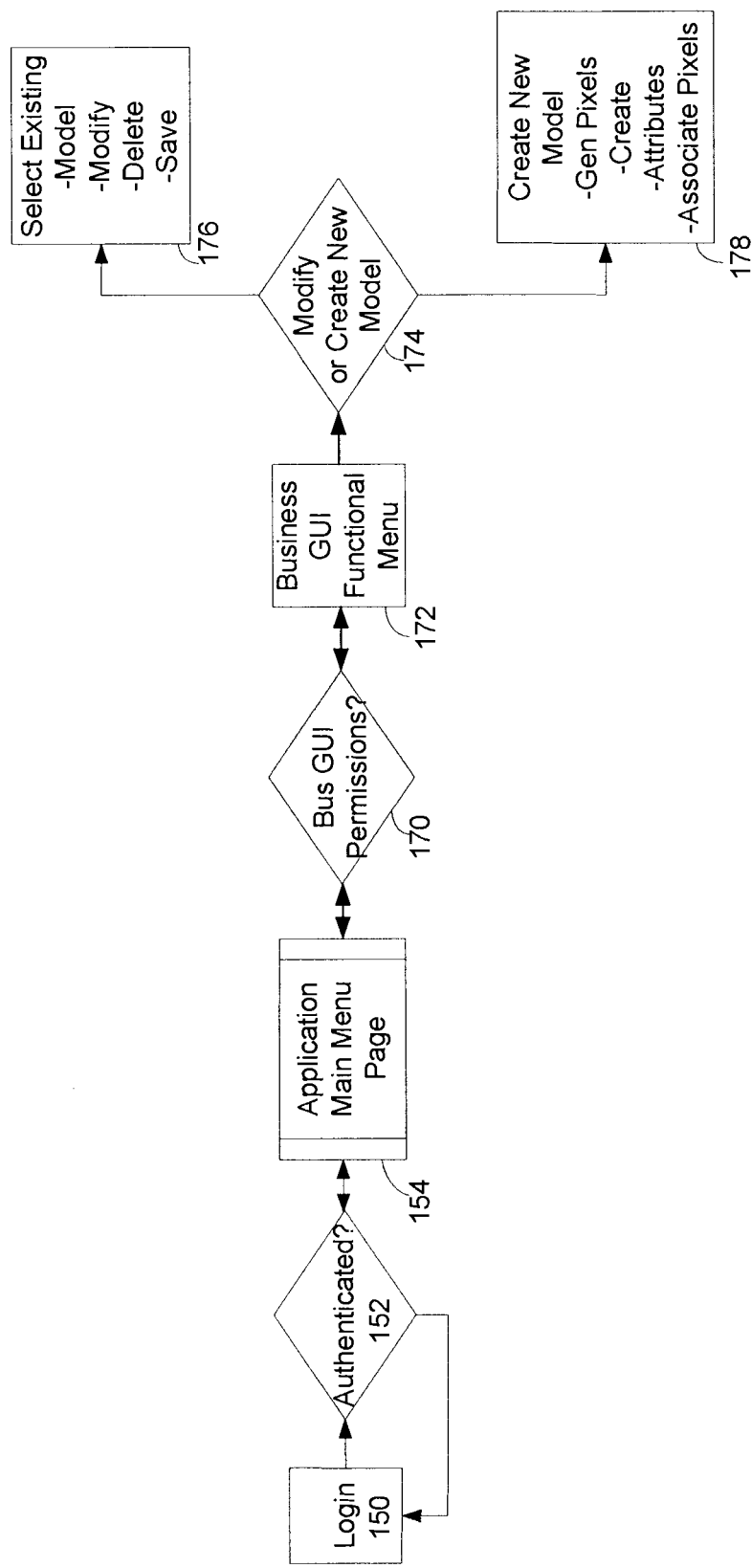
FIG. 3 is a process flow diagram of the application facilitating access to the business GUI module of the website monitoring system and method of the present invention.
Figure 4:
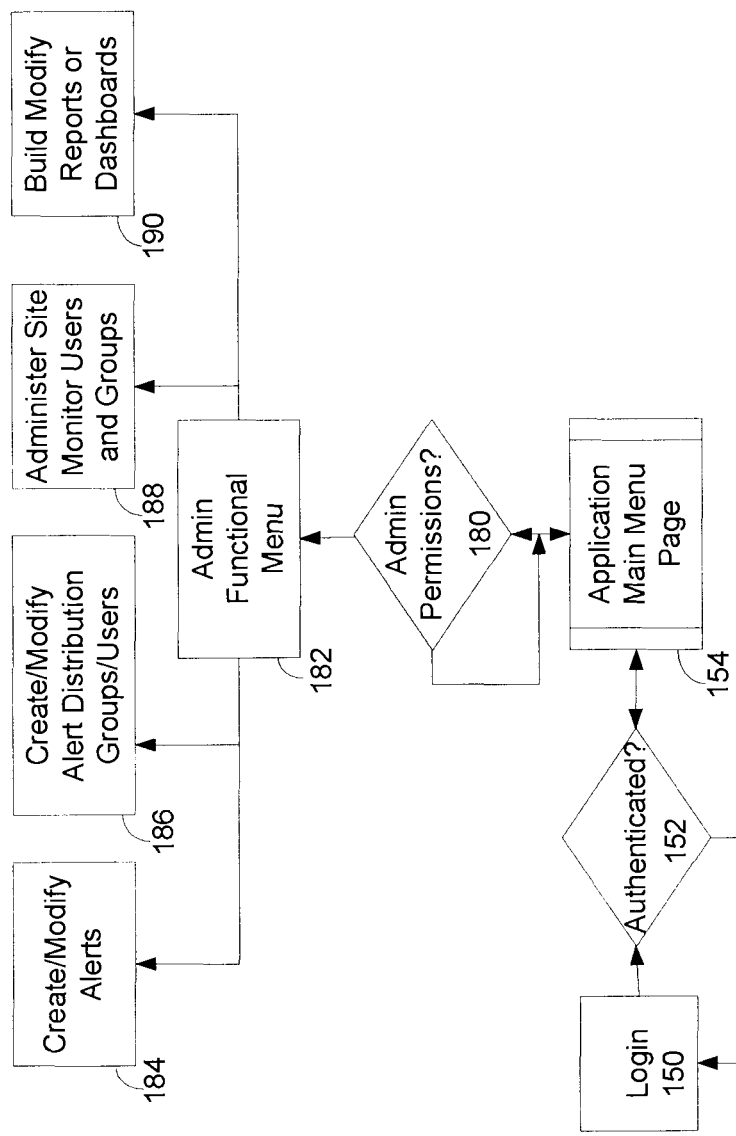
FIG. 4 is a process flow diagram of the application facilitating access to the administrative module of the website monitoring system and method of the present invention.

FIGS. 2-4 illustrate the process flow of the application when a user reaches the custom reports and dashboard module. As illustrated in FIG. 2 this flow allows a user to login 150, and have the login username and password authenticated 152. Following authentication of the username and password, the user reaches the application main menu 154. The application main menu 154 dynamically generates links to the user's specific dashboards and reports 162. Users who do not have reporting/dashboard permission(s) may not see any report links on the application main menu page. The application main menu page may utilize static links on the page and or drop-down lists. Dashboards and reports may be represented as one per screen or multiple dashboards on the same screen. On a report or dashboard there will be drill-down functionality that will take over the same screen with the newly requested level of detail or perspective representing the drill-down report data. The user can exit a report (i.e. go back to the application main menu 154) to select additional reports or Dashboards by clicking a "back to Main" navigation or using the top navigation within applications overall navigation.

The process flow for the business GUI is illustrated in FIG. 3, wherein a user logs in to the application 150 and has their respective login username and password authenticated 152. Following authentication of the username and password, the user reaches the application main menu 154. The application main menu 154 page will display links to the Business GUI functionality, when the user has the requisite permissions. The application determines whether the user has business GUI permissions 170 following login and the user selecting Business GUI on the application main menu. If the user has the required permission, a link to the business GUI shall be displayed and upon selection, the user shall be allowed access to the main Business GUI screen functional menu 172. If the user does not have permissions for Business GUI a link will NOT be displayed on the application main menu. From the business GUI functional menu 172, the user may select between modifying an existing model and building a new Model 174. This flow illustrates the user interaction and how the application may be used to execute certain functions. Screens and/or pop-up menus will be used to provide the user a drag and drop canvas with graphics/objects representing screens and their relationships. This GUI interface will be available for modify existing site models 176 and building new site models 178.

The process flow for the business GUI is illustrated in FIG. 4, wherein a user logs in to the application 150, and has their respective login username and password authenticated 152. Following authentication of the username and password, the user reaches the application main menu 154. The application main menu 154 page will display links to the Admin Functional menu following a determination by the application of whether the user has administrative permissions 180. If the user has the required permission, a link to the administrative module shall be displayed and upon selection, the user shall be allowed access to four administrative sub modules that allow the user to create alerts 184, create/modify alert distribution groups/users 186, administer site monitor users and groups 188, and build/modify reports or dashboards 190.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and or operational illustrations of methods, systems and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks floppy disks, or a CD-ROM, a carrier wave from the Internet, or other forms of RAM or ROM. Further, the disclosed methods' stages may be modified in any manner, including by reordering stages and or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and or methodological acts, the claims are not limited to the features or acts described above. Rather, the specific features and acts described above are disclosed as example for embodiments of the invention.

What is claimed is:

1. A web site performance monitoring system comprising:
   a performance module configured to allow a user to utilize a graphical interface to define and associate performance operational rules with a web site, wherein the performance module includes a module configured to assign site metric attributes to a single pixel on a page within the website, the site metric attributes comprising marketing information;
   a storage device configured to store data representative of the performance operational rules;
   a monitoring module configured to assess the effectiveness of the website at achieving performance criteria defined by the performance operational rules, wherein the monitoring module transmits alerts in response to the website failing to achieve the performance criteria defined by the website performance operational rules; and
   a report module configured to generate reports on operational performance and to display site level pixel metrics from the single pixel.

2. The website performance monitoring system of claim 1 wherein the performance module comprises an administrative module that is configured to allow users to create, modify and delete websites based on permission levels assigned to the users.

3. The website performance monitoring system of claim 1 wherein the performance monitoring system further includes:
   a business module configured to allow a user to interactively build a model representative of a website on a whiteboard, wherein drag and drop visual objects may be selected and utilized to build the website on the whiteboard; and
   a pop up menu configured to facilitate access to the drag and drop visual objects.

4. The website performance monitoring system of claim 1 wherein defining performance operational rules include setting performance operational thresholds and alerts.

5. The website performance monitoring system of claim 1 wherein the performance module includes a business module configured to generate pixels and facilitate management of websites, wherein the generation of pixels comprises generating pixel code to be placed on website pages.

6. The website performance monitoring system of claim 5 wherein assigning site metric attributes to a single pixel on a page within the website comprises performing at least one of the following, creating a pixel, adding a pixel, and modifying a pixel.

7. The website performance monitoring system of claim 6 wherein modifying a pixel includes at least one of the following, adding attributes to the pixel and deleting attributes from the pixel.

8. The website performance monitoring system of claim 1 wherein the performance module is configured to associate a plurality of websites, wherein a pixel of a page of a first website is linked to a pixel of a page of a second website.

9. The website performance monitoring system of claim 1 wherein the interactive links and menus of the performance module may be viewed and accessed based on a permission level assigned to a user.

10. The web site performance monitoring system of claim 1 wherein the report module is configured to allow users to create, view, refresh and print reports in multiple custom views.

11. A tool for interactively building website modules and performance measures configured to facilitate continuous assessment of the effectiveness of the website, wherein each page within the website provides for proactive monitoring of the page, the tool comprising:
    a website canvas configured to allow creation of a web page;
    a plurality of web page objects each configured to be dragged and dropped onto the generic website canvas to create a flow of web pages within a web site model;
    a pixel module which may be engaged to assign one or more site metric attributes to a pixel, wherein at least one pixel is associated with each web page, the one or more site metric attributes comprising finance information;
    a report module configured to display site level pixel metrics from the pixel.

12. The tool of claim 11 including a pop up menu configured to facilitate access to the plurality of web page objects which may be selected, dragged and dropped onto the website canvas to interactively build websites.

13. A method of configuring a website so that it continuously assesses the effectiveness of achieving previously defined performance objectives, the method comprising:
    setting website performance operational rules for the website;
    assigning site metric attributes to at least one pixel on a page of the Website, the site metric attributes comprising account collection information;

processing the website performance operational rules to determine whether the website achieves performance objectives associated with the website performance operational rules;

transmitting alerts to select systems upon a determination that website has not achieved the previously defined performance objectives associated with the website performance operational rules; and generating reports illustrating website operational performance by displaying site level pixel metrics from the one pixel.

14. The method of claim 13 further comprising:

interactively building the website model so that each page within the website model is configured to proactively monitor the performance operational rules; and accessing a whiteboard which is configured to include a pop up menu configured to facilitate access to drag and drop visual objects which may be selected and utilized to build the website on the whiteboard.

15. The method of claim 13 wherein the setting of website performance operational rules includes setting website performance operational thresholds, setting the manner in which alerts shall be delivered and defining a custom distribution list which identifies the select systems to which the alerts shall be delivered.

16. A system for interactively building websites configured to facilitate continuous assessment of the effectiveness of the website at achieving defined objectives, the system comprising:

a memory storage; and a processing unit coupled to the memory storage, wherein the processing unit is operative to:

setting performance objectives for the website;

assigning site metric attributes to a pixel on a page of the website, the site metric attributes comprising a business threshold;

processing the performance objectives previously set in view of activity at the website to determine whether the website achieves the performance objectives;

transmitting alerts to select systems upon a determination that website has not achieved the performance objectives; and generating reports illustrating how the website has performed in view of the operational rules.

17. The system of claim 16 wherein one pixel of a first page of a first website is linked to another pixel of a second page of a second website.

18. The system of claim 16 wherein assigning site metric attributes to the pixel comprises:

creating the pixel; and modifying the pixel.

19. The system of claim 16 wherein the select systems to which alerts shall be delivered are defined by setting a custom distribution list.

20. A computer-readable device which stores a set of instructions which when executed performs a method for configuring a website that continuously assesses the effectiveness of achieving previously defined performance objectives, the method executed by the set of instructions comprising:

setting website performance operational rules for the website;

assigning site metric attributes to a pixel on a page of the website the site metric attributes comprising a number of visitors to the website;

processing the website performance operational rules to determine whether the website achieves performance objectives associated with the website performance operational rules;

transmitting alerts to select systems upon a determination that website has not achieved the previously defined performance objectives associated with the website performance operational rules;

generating reports illustrating website operational performance.

* * * * *